United States Patent [19]
Vaghi

[11] Patent Number: 6,047,273
[45] Date of Patent: Apr. 4, 2000

[54] SYSTEM AND METHOD FOR REMOTELY PROVIDING MAILING/SHIPPING SERVICES TO CUSTOMERS

[75] Inventor: Nino Richard Vaghi, Bethesda, Md.

[73] Assignee: Vaghi Family Intellectual Properties, LLC, McLean, Va.

[21] Appl. No.: 09/129,122

[22] Filed: Aug. 4, 1998

[51] Int. Cl.[7] .................................................. G07B 17/00
[52] U.S. Cl. ........................... 705/410; 705/401; 710/8; 713/1; 713/2; 713/100
[58] Field of Search ................................... 705/401, 410; 710/8; 713/1, 2, 100

[56] References Cited

U.S. PATENT DOCUMENTS

| | | | |
|---|---|---|---|
| 4,528,644 | 7/1985 | Soderberg et al. | 705/410 |
| 4,590,557 | 5/1986 | Lillie | 364/100 |
| 4,812,992 | 3/1989 | Storace et al. | 364/464.02 |
| 4,837,714 | 6/1989 | Brookner et al. | 702/108 |
| 4,941,091 | 7/1990 | Breault et al. | 364/406 |
| 5,058,025 | 10/1991 | Haines et al. | 364/464.02 |
| 5,077,660 | 12/1991 | Haines et al. | 705/410 |
| 5,107,455 | 4/1992 | Haines et al. | 710/8 |
| 5,233,531 | 8/1993 | Shulz | 364/464.02 |
| 5,262,939 | 11/1993 | Vanpoucke | 364/401 |
| 5,319,562 | 6/1994 | Whithouse | 364/464.03 |
| 5,369,401 | 11/1994 | Haines | 705/403 |
| 5,606,507 | 2/1997 | Kara | 364/464.18 |
| 5,612,884 | 3/1997 | Haines | 705/403 |
| 5,675,493 | 10/1997 | Schwartz et al. | 177/25.15 X |
| 5,710,706 | 1/1998 | Markl et al. | 177/25.15 X |
| 5,737,426 | 4/1998 | Brookner et al. | 380/51 |
| 5,812,991 | 9/1998 | Kara | 705/410 |
| 5,978,860 | 11/1999 | Chan et al. | 710/8 |

*Primary Examiner*—Edward R. Cosimano
*Attorney, Agent, or Firm*—Whitham, Curtis & Whitham

[57] ABSTRACT

A system for remotely modifying a mailing/shipping program at a customer terminal includes a mailing/shipping service provider terminal which communicates with the customer terminal over a communications path. The method includes selecting a feature of the mailing/shipping program to be modified, communicating a request for modification of the feature to the service provider terminal, and then communicating activation information to the customer terminal over a secure link to perform the requested modification. The modification may be the activation or de-activation of the program feature. According to another method, a data base of customer information at the service provider terminal is searched to identify customers who might be interested in a newly developed program feature or who have pre-purchased a rate table update service. An electronic mail message embodying the new feature or rate table is then automatically communicated to the terminals of the identified customers for installation.

48 Claims, 6 Drawing Sheets

Mail Center Feature Order Form

Customer X mailing center

| Feature | Activated? | Price | | | |
|---|---|---|---|---|---|
| Best Way/Auto/Semi Auto | yes | $xx | Order Now! | Tell Me More | $10 Day Trial |
| Close Out Labels | yes | $xx | Order Now! | Tell Me More | $10 Day Trial |
| COD Totalizer | no | $xx | Order Now! | Tell Me More | $10 Day Trial |
| Cross Reference Reports | yes | $xx | Order Now! | Tell Me More | $10 Day Trial |
| Custom Carriers | yes | $xx | Order Now! | Tell Me More | $10 Day Trial |
| Accounting (100 acct.s) | no | $xx | Order Now! | Tell Me More | $10 Day Trial |
| Accounting (1000 acct.s) | yes | $xx | Order Now! | Tell Me More | $10 Day Trial |
| Accounting (10,000 acct.s) | no | $xx | Order Now! | Tell Me More | $10 Day Trial |
| Differential Weight | yes | $xx | Order Now! | Tell Me More | $10 Day Trial |
| Duplicate Invoice Monitor | no | $xx | Order Now! | Tell Me More | $10 Day Trial |
| Duplicate Label Printing | yes | $xx | Order Now! | Tell Me More | $10 Day Trial |
| Piece Count | yes | $xx | Order Now! | Tell Me More | $10 Day Trial |
| Phone Support (1 month) | yes | $xx | Order Now! | Tell Me More | $10 Day Trial |
| Phone Support (1 year) | yes | $xx | Order Now! | Tell Me More | $10 Day Trial |
| Phone Support (2 years) | yes | $xx | Order Now! | Tell Me More | $10 Day Trial |
| Domestic Mail Manual | yes | $xx | Order Now! | Tell Me More | $10 Day Trial |
| International Mail Manual | no | $xx | Order Now! | Tell Me More | $10 Day Trial |

[Show More?]

Rate Table

| | Activated? | Price | | | |
|---|---|---|---|---|---|
| Federal Express | | | | | |
| Next day | yes | $xx | Order Now! | Tell Me More | $10 Day Trial |
| Second day | no | $xx | Order Now! | Tell Me More | $10 Day Trial |
| UPS Service | | | | | |
| Ground, 3-day, 2-day, next | yes | $xx | Order Now! | Tell Me More | $10 Day Trial |
| GroundSaver | yes | $xx | Order Now! | Tell Me More | $10 Day Trial |
| Hazardous Material | no | $xx | Order Now! | Tell Me More | $10 Day Trial |
| Saturday Delivery | yes | $xx | Order Now! | Tell Me More | $10 Day Trial |
| DHL | | | | | |
| Express Document | no | $xx | Order Now! | Tell Me More | $10 Day Trial |
| Express Package | yes | $xx | Order Now! | Tell Me More | $10 Day Trial |
| U.S. Postal Service | | | | | |
| International Rates | no | $xx | Order Now! | Tell Me More | $10 Day Trial |
| Certified Return Receipt | yes | $xx | Order Now! | Tell Me More | $10 Day Trial |
| RPS Services | | | | | |
| Ground/RPS Air | yes | $xx | Order Now! | Tell Me More | $10 Day Trial |
| Hazardous Material | yes | $xx | Order Now! | Tell Me More | $10 Day Trial |

[Show More?]

Hardware

| | Price | | |
|---|---|---|---|
| Bar-code Wand | $xx | Order Now! | Tell Me More |
| Bar-code Gun | $xx | Order Now! | Tell Me More |
| OCR/BCR Scanner | $xx | Order Now! | Tell Me More |
| Scales | | | |
| 10 pound | $xx | Order Now! | Tell Me More |
| 30 pound | $xx | Order Now! | Tell Me More |
| 100 pound | $xx | Order Now! | Tell Me More |
| 300 pound | $xx | Order Now! | Tell Me More |

FIG. 4

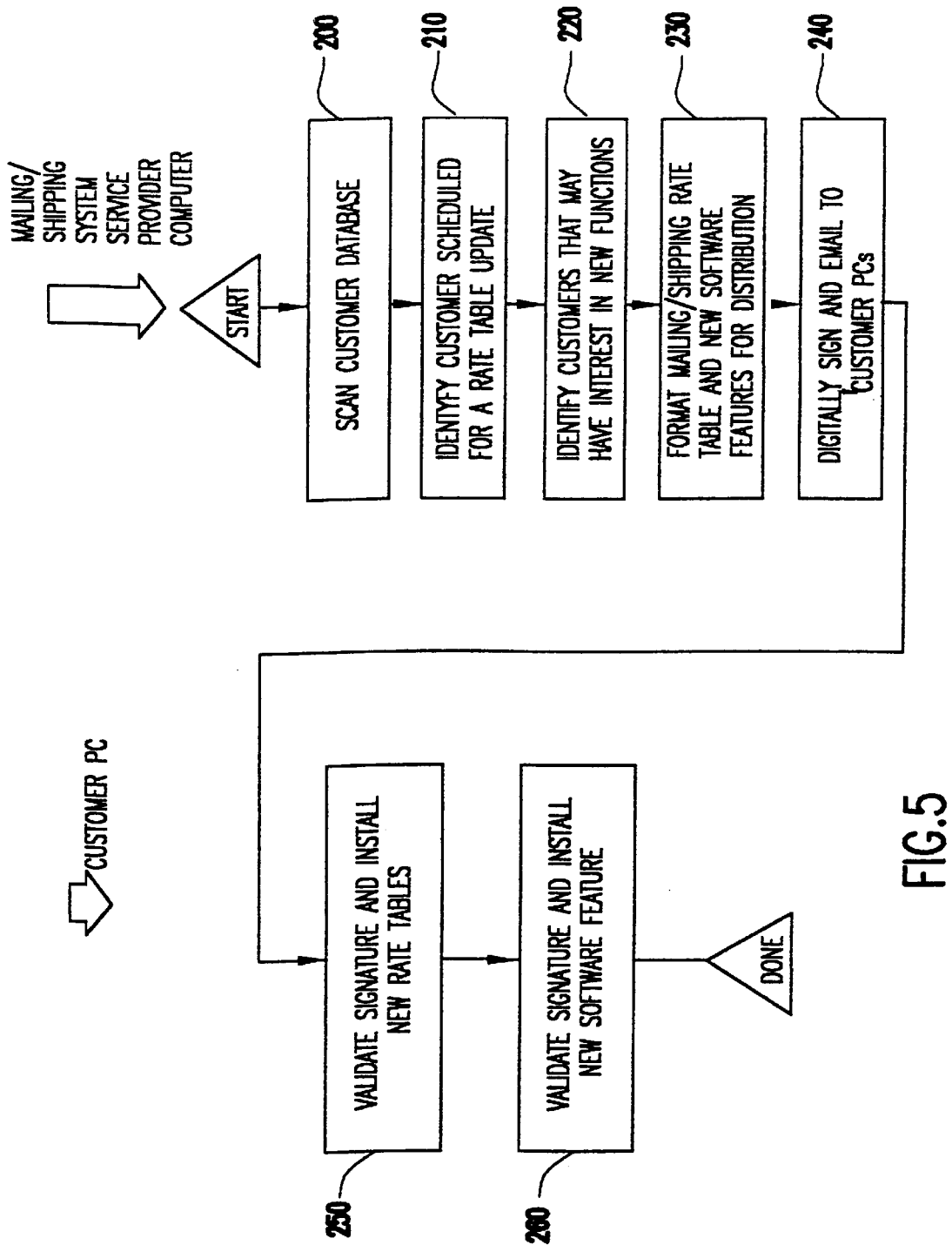

SYSTEM AND METHOD FOR REMOTELY PROVIDING MAILING/SHIPPING SERVICES TO CUSTOMERS

BACKGROUND OF THE INVENTION

1. Field of the Invention

This invention generally relates to electronic mailing/shipping systems, and more particularly to a system and method for providing mailing/shipping services to customers remotely located from a mailing/shipping service provider.

2. Description of the Related Art

A recent technological innovation in automated mailing and shipping systems is the integration of a personal computer (PC) with more traditional machines, such as scales, postal meters, mailing machines, and label printers. Use of PCs in these systems has produced a number of advantages over conventional systems. PCs have, for example, allowed mailing/shipping system service providers to increase the number and variety of features that can be offered to customers who mail or ship letters and parcels. Thus, with PCs, a number of mailing/shipping options can be provided to customers and customers can then select the best and/or least expensive mailing/shipping carrier.

Known automated mailing/shipping systems are not without drawbacks, however, and one of the chief drawbacks centers around their inability to be upgraded, if at all, in a convenient and economical way. Generally, these systems come in one of two types: 1) ones that are complete and fully capable systems that provide a full range of features, and 2) ones which come with a basic set of features which can, at a later date, can be upgraded to add features.

The system that is fully loaded (first type) is not economically practical because most customers will not use all the features offered on the system. Consequently, these customers end up paying for a more sophisticated system than they originally wanted, or wanted to pay for. Further, such a system typically cannot be modified to include new or upgraded features.

The system that provides a basic set of features (second option) provides customers with a more cost-effective, tailorable solution. However, upgrading this system has proven to be cumbersome and time-consuming. Upgrading a system of this type, for example, requires a visit from a technician or salesman, who must determine the customer's current configuration, determine which new features might be beneficial to the customer, describe available feature options, and place the order on behalf of the customer. This is frequently inconvenient for the customer and adds significant cost to the overall upgrading process.

From the foregoing, it is clear that a need exists for an improved automated mailing system and method, and more specifically one which can be upgraded or otherwise modified in a manner which is more efficient, more economical, and easier to use than known automated mailing systems and methods.

SUMMARY OF THE INVENTION

It is one object of the present invention to provide an automated mailing/shipping system and method which is more efficient, economical, and easier to use than conventional automated mailing/shipping systems and methods.

It is another object of the present invention to achieve the aforementioned object by remotely providing mailing/shipping services to customers, thereby eliminating the need for a technician or salesman to visit the customer site in order to provide these services.

It is another object of the present invention to provide a system and method for providing mailing/shipping services to customers in such a number and variety as to meet the individual and customized needs of customers.

It is another object of the present invention to provide a mailing/shipping system and method of any of the aforementioned types which can be easily, remotely, and electronically modified, over single or successive periods of time, to provide different or new mailing/shipping services to meet the changing needs of customers.

The foregoing and other objectives of the invention are achieved by providing a system and method which conveys mailing/shipping services to customers who are remotely located from a mailing/shipping service provider.

The system of the present invention includes a mailing/shipping systems service provider computer, at least one customer terminal, and a communications path (e.g., the Internet or a public switched telephone network) connecting the two. The service provider computer contains management and other software, and contains or accesses a data base of customer information. The customer terminal is equipped with a program having a number of active and inactive mailing/shipping features. The program may be one commercially available and adaptable to operated in accordance with the present invention, or one which has been specially designed. The customer terminal may also have access to a variety of conventional mailing/shipping devices and the mailing/shipping program may have features which assist a customer in the use of these devices.

In a first embodiment of the method of the present invention, a customer selects at least one feature of the mailing/shipping program for modification and communicates information identifying this feature to the service provider terminal. The service provider terminal communicates activation information to the customer terminal for activating this feature. Encryption\decryption keys are used to protect the exchange of information and electronic funds between the service provider and customer terminals. If desired, the activation information may be placed on a computer-readable medium and sent through the mail for installation by the customer himself. In addition, the method may also be adapted to allow customers to remotely order mailing/shipping hardware and supplies. This method is also advantageous because it can be used to perform successive software modifications as a way of continually meeting the needs of its customers.

In a second embodiment of the method of the present invention, a customer-terminal mailing/shipping program is remotely upgraded by maintaining a data base of customer information at a mailing/shipping service provider terminal, searching the data base for customers who might have interest in a new feature of the mailing/shipping software, creating an electronic mail message containing information which includes the new feature, communicating the electronic mail message to at least one of the customer terminals, and installing the new feature in the at least one customer terminal. The new feature is installed in such a manner that the new feature is in an inactive state until the customer at the customer terminal communicates with the mailing/shipping service provider terminal to have the new feature activated.

In a third embodiment of the method of the present invention, mailing/shipping software at a customer terminal is remotely upgraded by maintaining a data base of customer information at a mailing/shipping service provider terminal, searching the data base for customers who have ordered a rate table service, creating an electronic mail message containing information which includes a new rate table, sending the electronic mail message to terminals of the customers who have ordered the rate table service, and installing the new rate table at the terminals.

In a fourth embodiment of the method of the present invention, a computer-readable information, including a first mailing/shipping feature in an active state and a second mailing/shipping feature in an inactive state, is sent from the service provider to a plurality of customers. A customer then contacts the service provider to order activation of the second product, and the service provider communicates activation information to the customer to activate the second product in accordance with steps included, for example, in the first embodiment of the method of the present invention.

BRIEF DESCRIPTION OF THE DRAWINGS

FIG. 4 is a diagrammatic view of a computer screen listing software features and rate tables which can be modified in accordance with the first embodiment of the method of the present invention, as well as hardware and supplies of this embodiment.

FIG. 5 is a flow diagram showing steps included in second and third embodiments of the method of the present invention.

DESCRIPTION OF THE PREFERRED EMBODIMENTS

Figure 1:
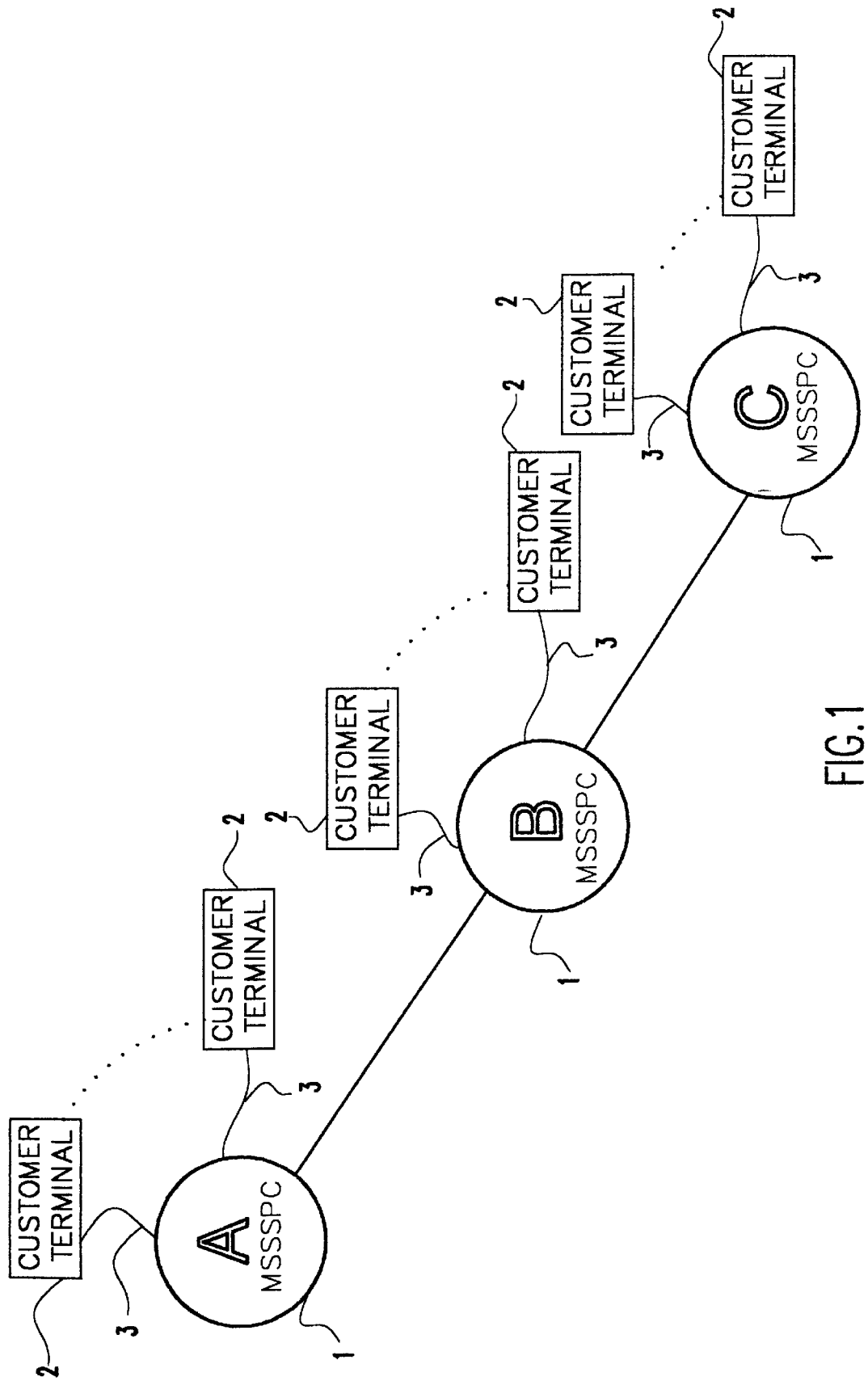
FIG. 1 is a conceptual diagram of the system of the present invention containing a plurality of mailing/shipping service provider sites for supporting customers in different geographical locations.

The present invention is a system and method for providing mailing/shipping services to customers remotely located from, for example, a mailing/shipping service provider. Referring to FIG. 1, an embodiment of the system of the present invention includes at least one mailing/shipping systems service provider computer (MSSSPC) 1, a customer mailing/shipping terminal 2, and a communications path 3 connecting MSSSPC 1 and the customer terminal 2. For purposes of convenience, the system of the present invention will, hereinafter, be described as having only one MSSSPC and one customer. Those skilled in the art can appreciate, however, that the service provider may have more than one business site (shown illustratively in FIG. 1 as sites A, B, and C) for serving customers located at different geographical regions, and in such a case each site may include its own MSSSPC 1 for serving customers in a respective region. Further, the MSSSPC at each site may be interconnected, e.g., via a wide-area network, Internet connection, or other conventional means, to allow for central management and control of the business activities at all sites. (Alternatively, one MSSSPC may be used to service a plurality of geographic locations, e.g., a county, state, country, or even the world).

The MSSSPC at each site contains or has access to a data base 17 of information about each of the service provider's customers. This information may include basic information such as customer name, address, phone number, e-mail address, points of contact, description of the version of software installed at a customer's terminal, and specialized information such as data indicating whether a rate table service has been subscribed to.

The MSSSPC is also equipped with management software for maintaining the customer data base and for communicating with each of the customer terminals. This software may include any or all of a server operating system (e.g., UNIX or MICROSOFT WINDOWS NT SERVER), a relational data base management system (e.g., ORACLE, SYBASE, INFORMIX, OR MICROSOFT SQL SERVER), and Internet-technology communications software. The server operating system software manages programs on the MSSSPC, the relational data base management software manages the customer data base, and the Internet technology communications software may include Web Server software which manages communications with the customer terminals through Internet-technology protocols such as Hyper-Text Transfer Protocol (HTTP) and TCP/IP. The Web server software may include programs such as MICROSOFT INTERNET INFORMATION SERVER, NETSCAPE COMMERCE SERVER, or the APACHE. Further, the Internet technology communications software may include security software, such as that available from RSA Data Security, Inc., which performs management encryption/decryption and digital signature tasks.

Figure 2:
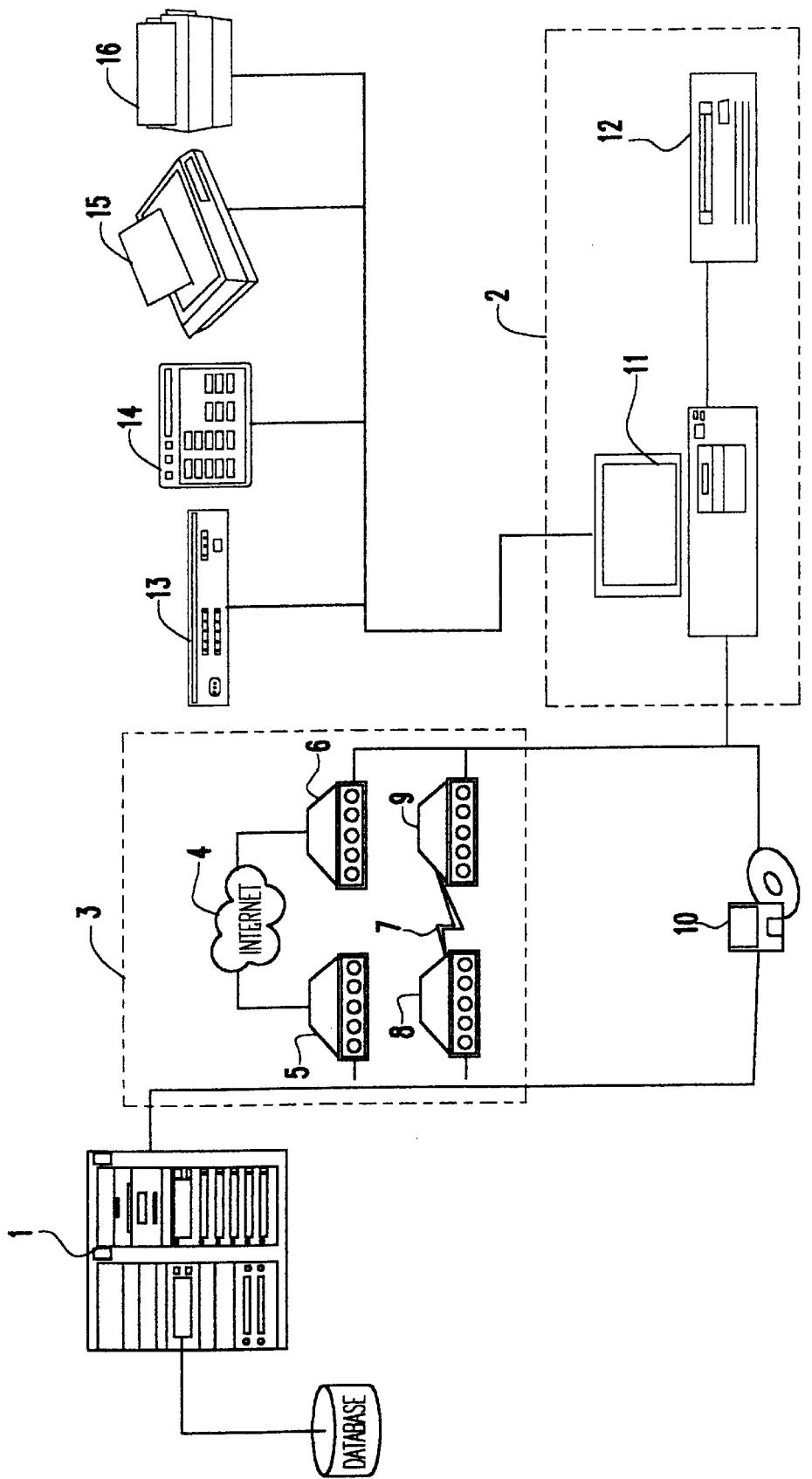
FIG. 2 is a block diagram of an embodiment of the system of the present invention.

Referring to FIG. 2, customer terminal 2 includes a computer 11 equipped with software for implementing mailing/shipping features provided by the MSSSPC. Preferably, computer 11 is a personal computer of standard architecture, but those skilled in the art can appreciate that other types of computers or computing devices may be used, as long as they can be adapted to run the mailing/shipping software. Mounted within, or peripheral to, computer 11 is a unit 12 for reading floppy disks, compact disks, digital tape, or other computer-readable media. A number of conventional mailing/shipping devices, such as a postage scale 13, a postage meter/mailing machine 14, a report printer 15, and a shipping label printer 16, may also be connected to this computer.

The MSSSPC communicates with the customer terminal through communications path 3, which may be a computer network such as the Internet 4 established through modems 5 and 6. Alternatively, communications path 3 may be a public switched telephone network 7 established through modems 8 and 9. In lieu of or in addition to path 3, communications between MSSSPC 1 and terminal 2 may take place through the exchange of computer-readable magnetic or optical media 10 conveyed through the mail.

Figure 3:
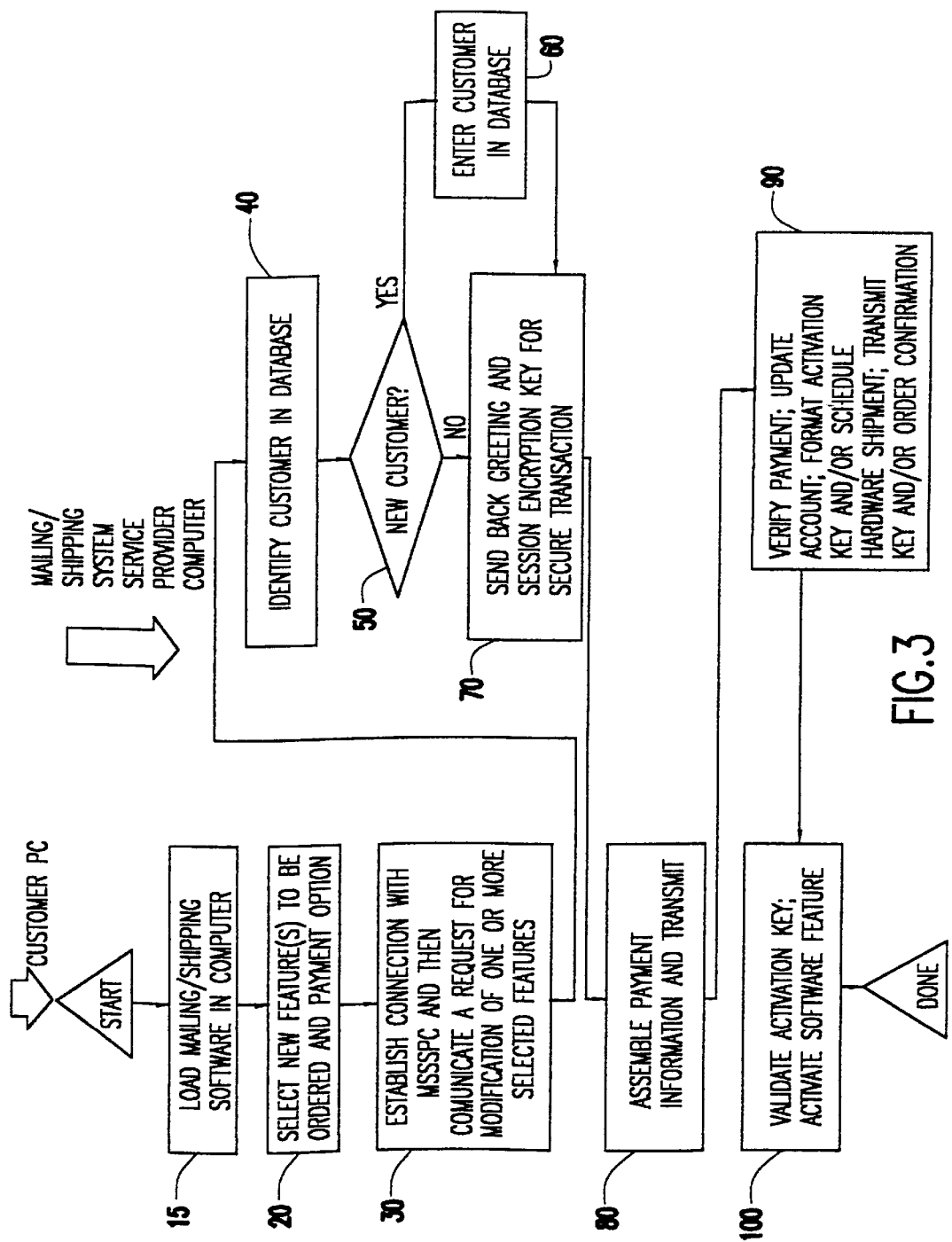
FIG. 3 is a flow diagram of steps included in a first embodiment of the method of the present invention.

The method of the present invention advantageously may be practiced in accordance with the system shown in FIGS. 1 and 2. Referring to FIG. 3, a first embodiment of the method of the present invention provides mailing/shipping services to a customer by remotely modifying one or more features of a mailing/shipping program installed in that customer's terminal.

An initial step of the method includes loading the mailing/ shipping program into personal computer 11. (Block 15). This mailing/shipping program may be one in existence as provided by one of a variety of known mailing/shipping service providers, and in such a case the program may be adapted to allow the method of the present invention to be practiced in accordance with such a program. Alternatively, the program may be new or specially developed software for implementing one or more mailing/shipping features. (It is understood that the MSSSPC may further be equipped with management software adapted to interact with the computer programs in each of the customer terminals, to thereby enable the steps of the present invention to be implemented in the manner to be described below.)

Further, the computer program in the customer terminal may be of a type which is adaptable so that only a desired number of features are activated for use, leaving the other features dormant or inactive but in a state capable of being activated in accordance with the present invention. During the initial step, therefore, the customer may request that only a predetermined number (e.g., a subset) of the mailing/shipping features of the computer program be activated. (Advantageously, the purchase price of the computer program may correspond to the number and/or type of features activated, thereby allowing the customer to achieve cost savings by paying for only those features desired. This computer program, thus, may be customized to meet the individual needs of each of its customers.)

The mailing/shipping features of the computer program may include those offered in known mailing/shipping programs, as well as new or customized features. These mailing/shipping features may include postage/shipping rate tables for one or more mailing and shipping carriers (including the U.S. Postal Service), rate calculation and accounting features, as well as other features for performing various mailing/shipping functions. An illustrative list of these features are provided below:

Rates
United States Postal Service (Domestic)
United States Postal Service (International)
United States Postal Service (Express Mail)
United States Postal Service—Single Rate Changes
United States Postal Service—Annual Rate Changes
Federal Express
Federal Express—Single Rate Changes
Federal Express—Annual Rate Changes
Emery
Emery—Single Rate Changes
Emery—Annual Rate Changes
UPS
UPS—Single Rate Changes
UPS—Annual Rate Changes
Airborne
Airborne—Single Rate Changes
Airborne—Annual Rate Changes
Roadway
Roadway—Single Rate Changes
Roadway—Annual Rate Changes
D.H.L.
D.H.L.—Single Rate Changes
D.H.L.—Annual Rate Changes
Programmable Carrier #1
Programmable Carrier #2
Programmable Carrier #3
Features
Accounting (100 accounts)
Accounting (1000 accounts)
Accounting (10,000 accounts)
Accounting (50,000 accounts)
Best Way/Rate Shop
Differential Weighing
Duplicate Label
Swog
Piece Count
Screen Saver
Password Security
Print Address Label
International Mail Manual—IMM
Domestic Mail Manual—DMM
Import Utility
Export Utility
Networking (Multi User—Single site)
Networking (Multi User—Multi site)
Newsletter—Single Subscription
Newsletter—Annual Subscription
Help Screen
Handling charge
Cross-Reference Reports
Manual Weight Entry
Inquiry Function
Void Function
Package Inquiry/edit/void
Repeat Transaction
COD Printing
Insurance Options
Self Insurance
Reports
Phone Support—30 day
Phone Support—6 months
Phone Support—12 months
Custom Software—Inquiry
Custom Software—$80/Hour
Data Merge
Barcode scanning
Data Range Reporting An additional list of these features is shown in FIG. 4, which will be discussed below in greater detail.

During use of the computer program, the customer may discover that it would be beneficial to activate or de-activate one or more of the mailing/shipping features of the computer program. Through the present invention, modifications may be made to activate or de-activate one or more of these features so that the customer may, at all times, enjoy the use of a mailing/shipping program customized to meet his needs.

A second step of the method, therefore, includes selecting one or more features of the mailing/shipping program to be modified. To assist a customer in making this selection, the computer program may be activated (e.g., via a mouse selection of an item in a drop-down menu) to display information indicating the presently active and inactive features of the mailing/shipping software, or any combination thereof.

FIG. 4 shows an exemplary type of computer screen. In this screen, features of the mailing/shipping software at terminal 2 are displayed, along with a brief description of each feature. An indication is also provided as to the activation status of each feature. Specifically, in the "ACTIVATED?" column, a "YES" is provided for features which are activated and a "No" is provided for those which are not. If desired, the computer screen may depict only the features which have or have not been activated.

The computer screen of the present invention may also include other information. For example, as shown, the computer screen includes a column entitled "PRICE" to indicate the activation fee corresponding to each feature of the mailing/shipping software. Selectable options are also provided to allow a customer to order the feature (i.e., the "ORDER NOW" option), to learn more about the feature (i.e., the "TELL ME MORE" option), and to order activation of the feature for an evaluation period prior to purchase(i.e., the "10 DAY TRIAL" option). Preferably, a plurality of windows displaying these features may be simultaneously displayed, and additional features within each window may be accessed by a scrolling function, e.g., see the "SHOW MORE ?" option.

The computer screen of the present invention may be accessed at the customer terminal in a variety of ways. For example, a customer at the terminal may retrieve the computer screen from a memory of computer 11, or the customer may connect to the MSSSPC and then download the form, for example, by accessing an appropriate MSSSPC Internet web page. One skilled in the art can appreciate that information corresponding to the software features available for use at the customer terminal may be provided in ways other than through a computer screen, e.g., through a computer print out.

Presentation of features may also be context-sensitive. When the customer is using a particular function of the program, information indicative of a related inactive feature could be displayed for the customer's consideration. In this regard, the computer of the customer terminal may monitor the business activities of the customer (e.g., the software features that he uses) and then display information concerning alternative or optional features which the customer might be interested in. If, for example, the customer used the mailing/shipping program to indicate that he would like to send a package by FedEx, the program may notify the subscriber that UPS has cheaper rates, thus giving the customer the opportunity to change his mind.

Returning to FIG. 3, where the left portion corresponds to activity that occurs in the computer at the customer terminal and the right portion corresponds to activity that occurs at the MSSSPC, the method continues by having a customer select one or more features of the mailing/shipping software to be modified. (Block 20). This selection may be performed, for example, by clicking on "ORDER NOW" icons adjacent appropriate ones of the software feature descriptions shown in FIG. 4. (While selection of features may be performed by this clicking function, those skilled in art can appreciate that other techniques may be used, e.g., via keyboard entry, touch screen, as well as by other conventional or equivalent input devices.)

After the features to be modified are selected, computer 11 connects to the MSSSPC through one of the communications paths previously discussed, i.e., through the Internet or public-switched telephone network. (Block 30). This connection may be performed, for example, by the customer clicking on an appropriate icon on the computer screen of FIG. 4 after all the features to be modified have been selected. Alternatively, the customer may call a customer representative at the MSSSPC to personally order the desired modifications on CD ROM or other computer-readable medium.

Once connection is established, the customer may communicate information, including a request for the one or more software features selected for modification, to the MSSSPC terminal. (Block 30). If the customer does not have access to a phone/modem connection, the mailing/shipping software may include a feature that will allow a customer to print out an order form containing these features. This form can then be conveyed to the MSSSPC by conventional methods, e.g., by sending it through the mail.

When the MSSSPC receives the information from the customer terminal, a data base may be scanned to determine whether the customer is an existing customer or a new customer. (Blocks 40 and 50). If it is determined that the customer is an existing customer, the MSSSPC transmits to the customer terminal through the communications path a greeting and a session encryption key to allow secure transactions to take place between the customer terminal and the MSSSPC for the remainder of the connection. (Block 70). The session encryption key may be established in accordance with a security protocol such as the Diffie-Hellman protocol or Secure Socket Layer (SSL). Those skilled in the art can appreciate, however, that other types of encryption keys, or methods of encryption, may be used.

If the customer's name does not appear in the data base, the MSSSPC creates a new record for the customer in the data base and fills it with the information conveyed to the MSSSPC. (Block 60). A similar greeting and encryption key may then be transmitted to the customer terminal for protection/security purposes. (Block 70).

The session encryption key may be included to secure information exchanges between the customer terminal and the MSSSPC, for example, for purposes of securing payment of the software features selected for modification, which may be made, for example, by conveying electronic funds (e.g., CYBERCASH) or credit card information to the MSSSPC. (Alternatively, an invoice may be sent to the customer for payment.) Other payment information may be conveyed with these funds, including name, address, phone number, and e-mail address. Preferably, the payment information is encrypted for security purposes, and then transmitted to the MSSSPC to purchase modification of the selected features. (Block 80).

Upon receiving the payment information, the MSSSPC validates the information, and updates the customer account in the data base. The MSSSPC then formats and transmits activation information, including, for example, an activation key, to the customer terminal through the communications path, if the one or more features selected for modification correspond to rate tables for mailing/shipping carriers (including the U.S. Postal Service), accounting features, or mailing/shipping software features. (Block 90). When the customer terminal receives the activation information, the software features selected in Block 20 are modified (e.g., activated and/or de-activated).

(Modification of features may be accomplished in accordance with any one of a variety of conventional software tools installed on computer 11. Software piracy prevention packages, as they are commercially known, is one example of a tool that can be used to serve this purpose. The modifications performed by these tools are then stored in the software of the customer terminal, and if the computer screen of FIG. 4 is also stored at the computer terminal, as opposed to being downloaded from a web site, the activation status in that screen is updated in accordance with the modifications performed.)

Preferably, the activation information is an electronic receipt for the feature modifications purchased. The receipt is digitally signed (using, for example, asymmetric encryption) by the MSSSPC. Since the receipt includes the customer name (or other unique identifier), the activation information is formatted by the MSSSPC to be unique to the customer terminal, and further, it can be made so that it cannot be improperly copied from customer to customer.

To protect the activation information from improper copying, it is noted that the customer's name may be included in computer program of the customer's terminal. The customer's name, for example, may be entered upon installation of the program and acceptance of software license terms. The activation key (digitally signed receipt) contains the customer's name, encrypted with the service provider's private key. As such, the customer cannot change the name in the activation key without knowledge of the service provider's activation key. If the activation key is copied to another customer's machine, it will not be valid because the other customer's software will be installed with a name that does not match the activation key.

Once received, the activation information is validated by software at the customer terminal. (Block 100). Validation is performed using, for example, asymmetric encryption which validates the digitally signed receipt. More specifically, software at the customer terminal decrypts the digital signature associated with the receipt by using a public key of the MSSSPC. If the digital signature decrypts properly and matches a hash of the receipt (or otherwise validates that the receipt was issued by the MSSSPC), the activation key is considered valid.

The public key of the MSSSPC relates to public key encryption, also known as asymmetric encryption. This technology is based on two related keys: one public and one private. A message encrypted with a private key can only be decrypted with the public key (and vice versa). The private key is known only to its owner. The public key is known to everyone. A message can be digitally signed by a key owner when the owner uses his/her private key to encrypt it. To validate the signature, anyone can apply the signator's public key to the digital signature. If the digital signature decrypts properly, it must be valid. Digital signature tools and algorithms implementing this technology have been developed, for example, by RSA Data Security, Inc. and Entrust Technologies, Ltd.

After the software features have been modified, the computer at the customer terminal may re-validate the activation information or perform other checks to ensure that the customer holds a valid digital receipt. According to another aspect of the invention, therefore, the software may be written so that the customer will not be able to execute the modified software features unless a valid receipt is available on the computer at the customer terminal.

Other aspects of the first embodiment of the method of the present invention may be appreciated. For example, if desired, or if the customer does not have access to a modem connection, the MSSSPC may communicate with the customer by sending the customer a CD, disk, or other computer-readable medium embodying the activation and other information needed to perform the modification steps previously described. The customer terminal software may then be modified accordingly.

According to another aspect, the method of the present invention also may be used by a customer to order hardware or supplies for the customer terminal. In accordance with this aspect of the method, a customer selects from a computer screen (see, e.g., FIG. 4) one or more hardware features (e.g., scales, bar-code wands, mailing machines, postage meters, etc.) or supplies. Information indicative of this selection is then communicated to the MSSSPC, and the MSSSPC, in response, orders these features and automatically schedules a hardware/supply shipment date. An order confirmation may then be automatically communicated to the customer terminal, either electronically, by mail, or both. (Block 90). An illustrative list of these hardware features and supplies are as follows:

Hardware
Meter Interface—Postalia
Meter Interface—Neopost
Meter Interface—Ascom
Meter Interface—Pitney Bowes
Remote Scale—10 lb.
Remote Scale—30 lb.
Remote Scale—70 lb.
Remote Scale—100 lb.
Remote Scale—150 lb.
Remote Scale—200 lb.
High Speed Report Printer
Medium Speed Report Printer
Laser Report Printer
Thermal Label Printer 3"
Thermal Label Printer 5"
Mailing Machine
Document Printer
COD Printer
Laser Wand
Laser Gun
Supplies
Manifest Labels 3"
Manifest Labels 5"
Sealing Water
80 Column Printer Paper
Printer Cover
Meter Tapes
Postal Meter Ink Second and third embodiments of the method of the present invention also remotely modify mailing/shipping software installed at a customer terminal. The modifications to be performed in these embodiments are either the addition of a new rate table to the customer terminal software (second embodiment) or the addition of a software feature which has been newly developed and which is now being offered for sale to customers (third embodiment). In addition, in the third embodiment, an existing feature may be modified.

Referring to FIG. 5, after the MSSSPC develops a new rate table, the MSSSPC scans its customer data base (Block 200) to identify customers who have paid for a rate table update service (Block 210). Similarly, after developing a new software feature, the MSSSPC may scan its customer data base to determine a list of those customers who might be interested in purchasing the new software feature (Block 220).

Data base scanning may be performed in accordance with management software at the MSSSPC which examines the customer records in data base 17, preferably on a periodic basis, to determine, on a customer-by-customer basis, which mailing/shipping features have been activated. It is then determined whether the new rate table or new feature developed is applicable to that customer (e.g., new bar-code features would be of interest to customers who have bar-code wands).

Another approach of data base scanning may be to use expert system algorithms to consider various factors about the customers, e.g., previous ordering patterns, geographic location, shipping volume, etc. New rate tables and features may then be linked to customers on this basis.

In a next step, the MSSSPC builds a list of these customers and formats information corresponding to the new rate tables or new software features into an e-mail message. (Block 230). The MSSSPC then digitally signs this message so that the computer at each customer terminal can validate that the rate table or new software feature came from the MSSSPC, has not been tampered with, and is virus free. (Block 240). The e-mail message is then sent. Preferably, the foregoing steps are automatically performed.

Upon receiving the e-mail message, the computer at each customer terminal validates the digital signature in the e-mail, after which the new rate table or new software feature may be installed. These validation and installation steps may be performed automatically by the computer. For example, when the e-mail is received, a notification may be displayed to the customer to that effect. The customer can then use an input device to instruct the management software at the terminal to install the new feature or rate table. Alternatively, when the e-mail is received, the new software feature or rate table may be installed automatically, i.e., without requiring a customer designation.

Also, or alternatively, when a new software feature is embodied in the e-mail, the new software feature may be installed automatically, but in an inactive state. In such a case, the computer will not activate the new software feature until the customer orders and pays for it and then receives the activation information in the manner previously indicated. (Blocks 250 and 260).

According to another aspect of the present invention, any or all of the aforementioned embodiments of the method of the present invention may include the additional step of downloading a newsletter to customers, either on a periodic basic or when customers order new or modified mailing/shipping features (including hardware and supplies), or both. The newsletter may report on new industry products, projected postal rate increases, impending changes in U.S. Postal Service and/or private carrier rates, competition in the industry, as well as other information such as an editorial column. New zip-codes may also be downloaded According to another aspect of the present invention, the service provider may mail out CDs containing, for example, domestic postal rates to persons who are not customers. The CDS may also contain information on how to contact the MSSSPC, for example, through the Internet in order to become a customer or on ordering other features, e.g., international or private carrier rates. Advantageously, the CD sent to the new customer may also include this other rate information in de-activated or inaccessible form. In this case, when the new customer contacts the MSSSPC, the MSSSPC may download to the new customer's terminal activation information of the aforementioned type which activates or otherwise makes accessible the other rate information. Those skilled in the art can appreciate that this same process can be used to activate information embodied on the CD other than rate information, e.g., such as ordering supplies, hardware, or to the extent possible any of the mailing/shipping software features listed above. The information on the CD may also include the complete mailing/shipping software as developed by the service provider of the MSSSPC.

Figure 6:
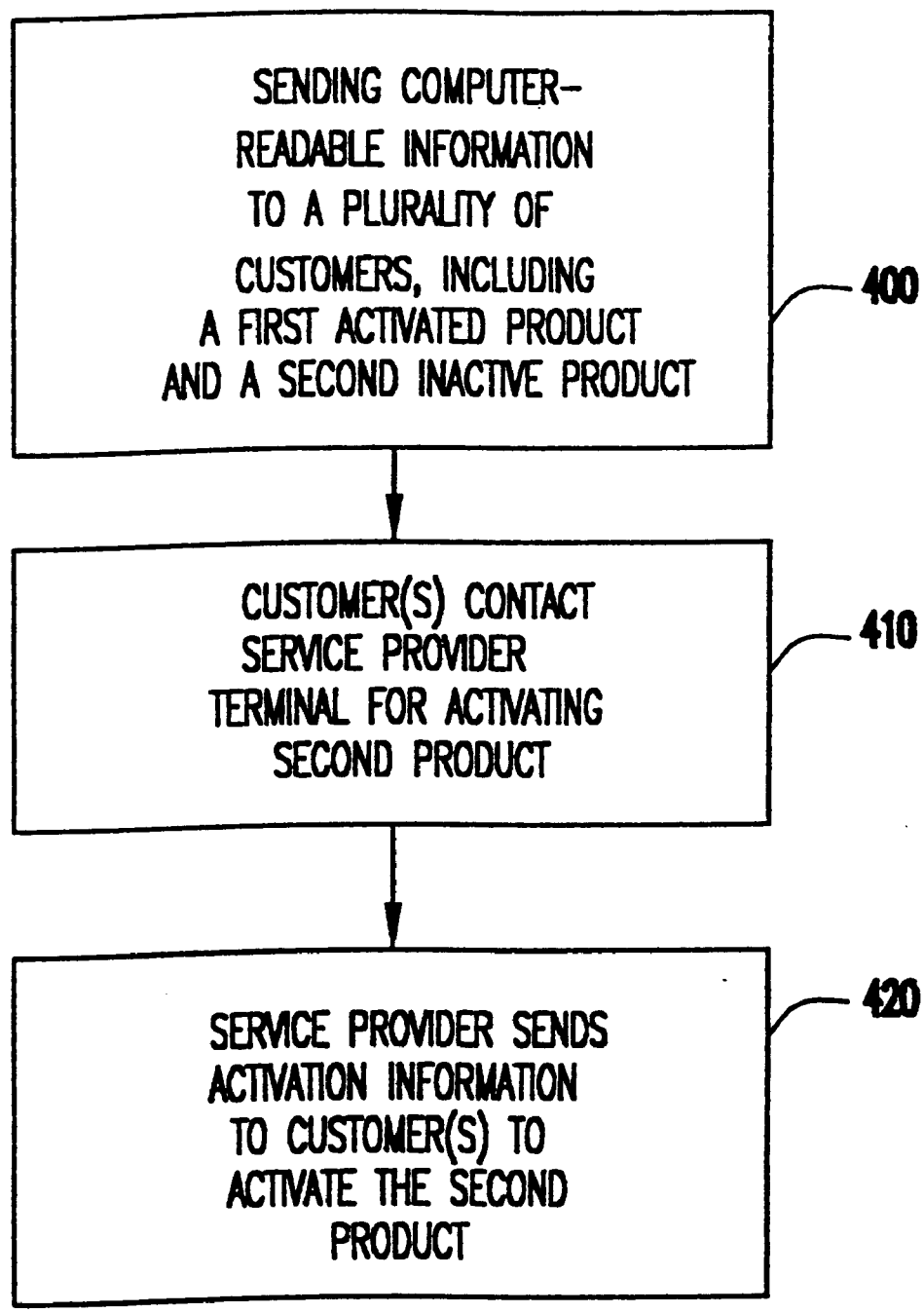
FIG. 6 is a flow diagram of steps included in a fourth embodiment of the method of the present invention.

Referring to FIG. 6, a fourth embodiment of the method of the present invention is advantageously used as a marketing strategy to sell the products of a mailing/shipping service provider to remotely located customers.

An initial step of this method includes sending computer-readable information from the service provider to a plurality of customers, for example, through the mail on a CD ROM or through the Internet as a downloadable file. (Block 400). This information includes information concerning various mailing/shipping products offered for sale by the service provider, including rate tables, hardware, supplies, a program having a plurality of mailing/shipping features, or any of the other products and services previously mentioned in connection with the other embodiments discussed herein.

Also, in the initial step, the computer-readable information includes a first one of the service provider's products in an active state (i.e., in a state which is immediately ready for use) when installed on a customer computer and at least a second product in an inactive state when so installed. As an example, the first product may be a rate table for the U.S. Postal service, and the second product may be a rate table for a private carrier. The first and second products may also be any of the features, rate tables, etc. previously discussed herein.

In a second step, one of the customers contacts the service provider to order activation of at least the second product. This contact can be made through any one of the communications paths previously mentioned. (Block 410).

In a third step, the service provider communicates activation information to this customer to activate the second product in accordance with steps included in the first embodiment of the method of the present invention. (Block 420).

Other modifications and variations to the invention will be apparent to those skilled in the art from the foregoing disclosure. Thus, while only certain embodiments of the invention have been specifically described herein, it will be apparent that numerous modifications may be made thereto without departing from the spirit and scope of the invention.

For example, in the method of FIG. 5, the MSSSPC may scan its customer data base to determine customers who might be interested in software features which are already in existence but who have not yet activated those features. An e-mail message may then be formatted and sent to these customers as a way of encouraging them to purchase these already existing features.

In addition, the first embodiment of the method of the present method may be used to modify features which have previously been modified, and thus in this vein the method of the present invention may be repeatedly and periodically used to effect modifications of software features over the life of the mailing/shipping software.

In addition, in at least the first embodiment, the mailing/shipping software at each customer terminal may be equipped with management functions which provide help menus to customers or which instruct the customer that he has attempted to use a mailing/shipping feature which is presently inactive on his terminal. With respect to this latter case, the basic software that manages the mailing/shipping features will check for the presence of a digitally signed receipt prior to executing any feature designated for use. If the digitally signed receipt is not stored on the computer of the customer terminal, and the customer attempts to invoke the feature, the customer will be notified that the feature has not been purchased and that the customer should purchase the feature if he wishes to use it.

What is claimed is:

1. A method for modifying mailing/shipping software, comprising steps of:

providing a mailing/shipping application program at a customer personal computer, said program having a graphical user interface for allowing a user to enter parameters which said program uses to compute mailing/shipping rates, said program further having a predetermined number of a plurality of mailing/shipping features activated;

displaying on said graphical user interface at the customer personal computer a screen listing said plurality of features in a selectable menu form;

performing-point-and-click selection of at least one feature of said plurality of features for modification from said screen;

communicating information including a request for modification of said at least one feature to a mailing/shipping service provider terminal;

communicating, in response to said request, activation information from the mailing/shipping service provider terminal to the customer personal computer; and modifying said at least one selected feature in accordance with said activation information.

2. The method of claim 1, wherein said at least one feature is at least one of a mailing/shipping feature of said program, a rate table, and an accounting feature.

3. The method of claim 1, wherein said at least one feature is at least one which was not activated before selection of said at least one feature, and wherein said activation information causes said at least one feature to be activated.

4. The method of claim 1, wherein said at least one feature is at least one which was activated before selection of said at least one feature, and wherein said activation information causes said at least one feature to be de-activated.

5. The method of claim 1, wherein at least one of said communicating steps is performed over a communication path selected from one of the group consisting of the Internet and a public switched telephone network.

6. The method of claim 1, further comprising:

formatting said activation information so as to be unique to said personal computer.

7. The method of claim 1, wherein said predetermined number is less than all of said plurality of mailing/shipping features.

8. The method of claim 1, further comprising:

displaying on a screen of said graphical user interface in association with each of said features a price for activating said feature.

9. The method of claim 1, further comprising:

displaying on the screen of said graphical user interface in association with each of said features a selectable icon which tells a user more about said feature.

10. The method of claim 1, further comprising:

displaying on the screen of said graphical user interface in association with each of said features a selectable icon for ordering said feature for an evaluation period.

11. The method of claim 1, wherein said mailing/shipping program computes one of a group consisting of 1) private carrier rates and 2) private carrier rates and United States potage.

12. The method of claim 1, wherein said step of communicating activation information from the mailing/shipping service provider terminal to the customer personal computer includes inputting said activation information into said customer personal computer without user intervention, and wherein said step of modifying said at least one selected feature in accordance with said activation information includes modifying said at least one selected feature automatically without user intervention.

13. The method of claim 1, further comprising:

securing communications between the personal computer and the mailing/shipping service provider terminal.

14. The method of claim 13, wherein said securing step includes:

communicating, from the mailing/shipping service provider terminal, upon receipt of said request, an encryption key for securing exchanges of information between the personal computer and the mailing/shipping service provider terminal.

15. The method of claim 14, wherein said encryption key is one based on asymmetric encryption.

16. The method of claim 14, further comprising:

electronically conveying payment for modification of said at least one feature to said mailing/shipping service provider terminal.

17. The method of claim 16, further comprising:

verifying said payment at the mailing/shipping service provider terminal before said step of communicating said activation information.

18. The method of claim 14, wherein said activation information is digitally signed at the mailing/shipping service provider terminal using a form of encryption compatible with said encryption key.

19. The method of claim 18, further comprising:

determining, at the personal computer, whether said activation information is valid; and performing said modifying step only if said activation information is determined to be valid.

20. A method for modifying mailing/shipping software, comprising steps of:

providing a mailing/shipping program at a customer terminal, said program having a predetermined number of a plurality of mailing/shipping features activated;

selecting at least one feature from said plurality of features for modification;

communicating information including a request for modification of said at least one features to a mailing/shipping service provider terminal;

communicating, in response to said request, activation information from the mailing/shipping service provider terminal to the customer terminal; and modifying said at least one selected feature in accordance with said activation information, wherein said modifying step includes:

modifying said at least one feature for a predetermined period of time;

continuing modification of said at least one feature after expiration of said predetermined period of time if payment for said modification is made within said predetermined period of time; and removing said modification if payment is not made within said predetermined time period.

21. A method for modifying mailing/shipping software, comprising steps of:

providing a mailing/shipping application program at a customer personal computer, said program having a graphical user interface for allowing a user to enter parameters which said program uses to compute mailing/shipping rates, said program further having a predetermined number of a plurality of mailing/shipping features activated;

selecting, using an input device of said personal computer, at least one feature from said plurality features for modification;

communicating information including a request for modification of said at least one feature to a mailing/shipping service provider terminal;

communicating, in response to said request, activation information from the mailing/shipping service provider terminal to the customer personal computer;

modifying said at least one selected feature in accordance with said activation information;

selecting at least one of a supply or hardware feature for use at the personal computer;

communicating a request for the supply or hardware features to the mailing/shipping service provider terminal; and automatically scheduling a shipment date of the supply or hardware features at the mailing/shipping service provider terminal.

22. The method of claim 21, further comprising:
downloading data to the personal computer confirming scheduling shipment of the supply or hardware feature.

23. A method for modifying mailing/shipping software, comprising steps of:
providing a mailing/shipping program at a customer terminal, said program having a predetermined number of a plurality of mailing/shipping features activated;
selecting at least one feature from said plurality of features for modification;
communicating information including a request for modification of said at least one features to a mailing/shipping service provider terminal;
communicating, in response to said request activation information from the mailing/shipping service provider terminal to the customer terminal;
modifying said at least one selected feature in accordance with said activation information;
designating one feature from said plurality of mailing/shipping features to accomplish a mailing/shipping objective; and
automatically displaying, at the customer terminal, information indicating at least one additional feature of said plurality of mailing/shipping features related to said designated feature.

24. The method of claim 23, wherein said at least one additional feature is displayed to give a customer at the customer terminal an option of accomplishing said mailing/shipping objective through use of either said designated feature or said at least one additional feature.

25. The method of claim 23, wherein said designated feature is a price from a rate table from a first carrier and wherein said at least one additional feature is a cheaper price from a second carrier.

26. The method of claim 23, wherein when said one designated feature is one of a private carrier rate or a United States postal rate, said method includes displaying a rate from a competitor carrier or the United States postal rate which is cheaper than said designated rate.

27. A method for updating a mailing/shipping program having a plurality of mailing/shipping features, said mailing/shipping program being installed in each of a plurality of customer terminals, said method comprising steps of:
maintaining a data base of customer information at a mailing/shipping service provider terminal;
searching said data base for customers who might have interest in a new feature of said mailing/shipping program;
creating an electronic mail message containing information including said new feature;
communicating the electronic mail message to at least one of said customer terminals; and
installing said new feature at said at least one of said customer terminals,
wherein said new feature is installed in an inactive state until a customer at said at least one customer terminal communicates with said mailing/shipping service provider terminal to have said new feature activated.

28. The method of claim 27, wherein said new feature includes one of a newly developed feature of said mailing/shipping program and an existing feature of said program which has been modified.

29. The method of claim 27, wherein said searching, creating, and communicating steps are performed automatically.

30. The method of claim 29, wherein said installing step is automatically performed when said at least one of said customer terminals electronically connects to said mailing/shipping service provider terminal.

31. The method of claim 30, wherein said installing step is automatically performed only after said customer designates that said new feature is to be installed in said program.

32. A method for updating a mailing/shipping program having a plurality of mailing/shipping features, said mailing/shipping program being installed in each of a plurality of customer terminals, said method comprising steps of:
maintaining a data base of customer information at a mailing/shipping service provider terminal;
searching said data base for customers who have ordered a rate table service;
creating an electronic mail message containing information which includes a new rate table; and
sending the electronic mail message to terminals of said customers who have ordered said rate table service.

33. The method of claim 32, wherein said searching, creating, and sending steps are performed automatically.

34. The method of claim 33, further comprising:
automatically attaching additional information to said electronic mail message, said additional information including at least one selected from the group consisting of a newsletter, industry marketing information, and notifications of impending rate changes.

35. The method of claim 33, further comprising:
installing said new rate table at said terminals.

36. The method of claim 35, wherein, in each of said terminals, said installing step is automatically performed when the terminal electronically connects to said mailing/shipping service provider terminal.

37. A method of providing mailing/shipping services to remotely located customers, comprising:
sending computer-readable information from a mailing/shipping service provider to a plurality of potential customers, said information including information on a plurality of products of said service provider, with a first product of said plurality of products being in an active state when installed in a computer and a second product being in an inactive state when installed, at least one of said potential customers installing said computer-readable information onto a computer of said one potential customer;
establishing a communications path between the computer of said one potential customer and a service provider computer, said communications path being initiated by said one potential customer;
sending a request for the second product from the computer of said potential customer to said service provider computer over said communications path;
sending activation information, from said service provider computer to the computer of said one potential customer, to place in an active state the second product as installed on the computer of said one potential customer.

38. The method of claim 37, wherein said first product and said second product are selected from the group consisting of a mailing/shipping rate table service, mailing/shipping hardware or supplies, and a program for performing a plurality of mailing/shipping functions.

39. A system for remotely modifying a mailing/shipping program, comprising:
a customer personal computer which includes:

(a) a memory which stores a mailing/shipping application program having a predetermined number of a plurality of mailing/shipping features activated, (b) a graphical user interface which allows a user to enter parameters which said program uses to compute mailing/shipping rates, said graphical user interface displaying a screen at the customer personal computer listing said plurality of features in a selectable menu form, (c) an input device which allows a user to perform point-and-click selection of at least one feature from said plurality of features for modification from said screen, (d) a processor which forms a request for modification of said at least one feature, and (e) a communications unit which communicates said request;

a mailing/shipping service provider terminal which generates activation information in response to receipt of said request from said customer personal computer, wherein said customer personal computer further includes a first unit which receives said activation information form said mailing/shipping service provider terminal, and a second unit which modifies said at least one selected feature in accordance with said activation information.

40. The system of claim 39, wherein said first unit inputs said activation information into said customer personal computer without user intervention and said second unit automatically modifies said at least one selected feature without user intervention.

41. The system of claim 39, further comprising:

a communications path for conveying said request from said customer personal computer to said mailing/shipping service provider terminal, and for conveying said activation information from said mailing/shipping service provider terminal to said customer personal computer.

42. The system of claim 41, wherein said communications path is one of the Internet and a public switched telephone network.

43. The system of claim 41, wherein said customer personal computer and said mailing/shipping service provider personal computer each include:

a unit for encrypting information to be transmitted along said communications path; and a unit for validating information received from said communications path.

44. A method for modifying a mailing/shipping system, said system including at least one customer personal computer and at least one service provider terminal, said method comprising steps of:

providing a mailing/shipping application program at a customer personal computer;

selecting at least one of a supply or hardware feature for use at the customer personal computer;

communicating a request for said at least one supply or hardware feature to the service provider terminal through the internet; and shipping said at least one supply or hardware feature to said customer personal computer in response to said request.

45. A method for performing mailing/shipping services, comprising:

providing a mailing/shipping application program at a customer personal computer, said mailing/shipping application program having a graphical user interface for allowing a user to enter parameters which said program uses to compute at least one of postal and private carrier rates;

displaying on said graphical user interface a list of features of said mailing/shipping application program, said list including a graphical indication of an activation state of said features;

performing point-and-click selection of one or more of said features whose activation state is to be modified from said list of features displayed on said graphical user interface;

transmitting a request for modifying the activation state of said one or more selected features to a mailing/shipping service provider over a communications network;

transmitting, from said mailing/shipping service provider over the communications network, activation state information; and automatically modifying only said one or more selected features based on said activation state information.

46. The method of claim 45, wherein said activation state information includes:

control information for configuring said mailing/shipping application program at said customer personal computer to receive at least one of an updated postal rate table and an updated private carrier rate table; and information including at least one of said updated postal rate table and an updated private carrier rate table.

47. The method of claim 45, wherein said communications network is the internet.

48. The method of claim 47, wherein said selecting step includes:

contacting a web site of said mailing/shipping service provider;

accessing said list of features from said website; and individually selecting one or more of said features from said web site list for modification.

* * * * *